United States Patent
Nakamura et al.

(10) Patent No.: US 9,350,023 B2
(45) Date of Patent: May 24, 2016

(54) NEGATIVE ELECTRODE FOR NONAQUEOUS ELECTROLYTE SECONDARY CELL, METHOD OF MANUFACTURING THE SAME, AND NONAQUEOUS ELECTROLYTE SECONDARY CELL

(75) Inventors: Toshikazu Nakamura, Fukushima (JP); Hisashi Tsujimoto, Fukushima (JP); Yoshiaki Obana, Kanagawa (JP)

(73) Assignee: Sony Corporation, Tokyo (JP)

( * ) Notice: Subject to any disclaimer, the term of this patent is extended or adjusted under 35 U.S.C. 154(b) by 458 days.

(21) Appl. No.: 12/862,210

(22) Filed: Aug. 24, 2010

(65) Prior Publication Data

US 2011/0052984 A1 Mar. 3, 2011

(30) Foreign Application Priority Data

Sep. 3, 2009 (JP) ................ P2009-203398

(51) Int. Cl.
| | |
|---|---|
| H01M 4/60 | (2006.01) |
| H01M 4/62 | (2006.01) |
| H01M 4/04 | (2006.01) |
| H01M 4/131 | (2010.01) |
| H01M 4/1391 | (2010.01) |
| H01M 10/0525 | (2010.01) |

(52) U.S. Cl.
CPC ............ *H01M 4/621* (2013.01); *H01M 4/0404* (2013.01); *H01M 4/131* (2013.01); *H01M 4/1391* (2013.01); *H01M 4/623* (2013.01); *H01M 10/0525* (2013.01); *Y02E 60/122* (2013.01); *Y02P 70/54* (2015.11); *Y10T 29/49115* (2015.01)

(58) Field of Classification Search
USPC ........................................... 429/213
See application file for complete search history.

(56) References Cited

U.S. PATENT DOCUMENTS

| | | | |
|---|---|---|---|
| 5,721,069 A | 2/1998 | Shoji et al. | |
| 6,294,290 B1 | 9/2001 | Kim | |
| 7,923,400 B2 * | 4/2011 | Saito et al. | 502/101 |
| 2002/0061440 A1 | 5/2002 | Suzuki et al. | |
| 2002/0122983 A1 * | 9/2002 | Nakai et al. | 429/224 |
| 2004/0058247 A1 * | 3/2004 | Omaru | 429/234 |
| 2006/0222952 A1 * | 10/2006 | Kono et al. | 429/231.95 |
| 2007/0195125 A1 * | 8/2007 | Saito | B41J 2/01 347/54 |
| 2007/0275302 A1 * | 11/2007 | Sotowa et al. | 429/217 |

(Continued)

FOREIGN PATENT DOCUMENTS

| | | |
|---|---|---|
| JP | 09-161777 | 6/1997 |
| JP | 09-329946 | 12/1997 |

(Continued)

*Primary Examiner* — Ula C Ruddock
*Assistant Examiner* — Lisa S Park
(74) *Attorney, Agent, or Firm* — K&L Gates LLP

(57) ABSTRACT

A negative electrode for a nonaqueous electrolyte secondary cell, includes: a negative electrode active material layer containing a negative electrode active material, a polyvinylidene fluoride component including polyvinylidene fluoride and/or a derivative having polyvinylidene fluoride as a main chain, a styrene-butadiene component including a styrene-butadiene polymer and/or a derivative having a styrene-butadiene polymer as a main chain, a nonionic surfactant having an HLB of 10 to 15, and N-methylpyrrolidone; and a foil-shaped negative electrode current collector provided with the negative electrode active material layer on at least one principal surface of the collector.

13 Claims, 2 Drawing Sheets

(56) References Cited

U.S. PATENT DOCUMENTS

2008/0292969 A1* 11/2008 Mori et al. .................. 429/303
2010/0028773 A1* 2/2010 Hirota et al. ................ 429/203
2011/0176255 A1* 7/2011 Sasaki et al. ................ 361/502

FOREIGN PATENT DOCUMENTS

| JP | 11-214012 | 8/1999 |
| JP | 2002-075377 | 3/2002 |
| JP | 2002-075458 | 3/2002 |

* cited by examiner

NEGATIVE ELECTRODE FOR NONAQUEOUS ELECTROLYTE SECONDARY CELL, METHOD OF MANUFACTURING THE SAME, AND NONAQUEOUS ELECTROLYTE SECONDARY CELL

CROSS REFERENCES TO RELATED APPLICATIONS

The present application claims priority to Japanese Priority Patent Application JP 2009-203398 filed in the Japan Patent Office on Sep. 3, 2009, the entire content of which is hereby incorporated by reference.

BACKGROUND

The present application relates to a negative electrode for use in a nonaqueous electrolyte secondary cell, a method of manufacturing the negative electrode, and a nonaqueous electrolyte secondary cell using the negative electrode. More particularly, the present application relates to a negative electrode for a nonaqueous electrolyte secondary cell which electrode is foil-like or sheet-like in shape and suitable for being formed into a thin foil and for enhancing capacity, a method of manufacturing the negative electrode, and a nonaqueous electrolyte secondary cell using the negative electrode.

In recent years, attendant on the tendency toward a still higher capacity of nonaqueous secondary cells represented by lithium ion secondary cells, an increase in the loading weight of an electrode composition per cell by enhancing the volume density (composition density) of the electrode composition has been performed as a technique for increasing the capacity.

For the negative electrodes in the nonaqueous electrolyte secondary cells of the above-mentioned type, carbon materials such as graphite are widely used. The carbon materials show a factor of volume expansion attendant on charging of about 1.2, which value is smaller than those of silicon and tin-based alloy negative electrode materials. Therefore, the carbon materials promise higher-capacity cells on a theoretical basis, if such defects as cutting of the electrode plate or peeling or cracking of an electrolyte layer (negative electrode composition layer) are absent.

Under such circumstances, in connection with nonaqueous electrolyte secondary cells using a carbon material for a negative electrode, various improvements in negative electrode characteristics have been attempted, such as the use of a flexible rubber component, e.g., styrene-butadiene rubber, for the negative electrode.

For instance, a method of manufacturing a negative electrode wherein carboxymethyl cellulose is used as a thickener and a styrene-butadiene rubber which is a rubber polymer is used as a binder has been widely known (see, for example, Japanese Patent No. 3286516, which is hereinafter referred to as Patent Document 1). In this method, a negative electrode composition slurry is prepared as a water-soluble dispersion, and, after coating with the dispersion and drying, the negative electrode is molded.

On the other hand, polyvinylidene fluoride widely used as a binder in fabrication of a negative electrode is not soluble in water. In view of this, a method in which a polyvinylidene fluoride powder is mixed into an aqueous slurry containing carboxymethyl cellulose and styrene-butadiene rubber as main ingredients has also been proposed (see, for example, Japanese Patent Nos. 3615472 and 3621031, which are hereinafter referred to as Patent Documents 2 and 3, respectively).

On the contrary, a method in which a solution prepared by using N-methylpyrrolidone (which is widely used as an organic solvent) and containing polyvinylidene fluoride as a main ingredient is admixed with a styrene-butadiene rubber powder having chain terminals modified by a nitrile group or with a styrene-butadiene rubber powder (which case is not clearly described, though) has also been proposed (see, for example, Japanese Patent Laid-open No. Hei 11-214012, which is hereinafter referred to as Patent Document 4).

Meanwhile, carboxymethyl cellulose having a cellulose skeleton as a main chain is a water-soluble thickener and, hence, it is used as an aqueous slurry forming agent or as a binder at the time of molding a negative electrode composition layer. When the thus molded negative electrode plate is subjected to a heat treatment in a non-oxidizing atmosphere, new linkages including ether linkages based on cellulose ring opening or on side chains are formed. It is known that, as a result of the formation of new linkages, an increasing effect on the lithium ion insertion/extraction efficiencies similar to that of a solid-liquid interface layer and a neutralizing effect on carbon surface hydroxyl groups due to a weak-acidifying effect at the time of heat treatment are obtained. Accordingly, an improving effect on charge-discharge characteristics and a suppressing effect on gas generation during first-time charging are exhibited, as known (see, for example, Japanese Patent No. 3191614, which is hereinafter referred to as Patent Document 5).

SUMMARY

In the technique described in Patent Document 1, however, CMC (carboxymethyl cellulose salt) is soluble in water and is insoluble in N-methylpyrrolidone (NMP). In addition, SBR (styrene-butadiene rubber) is also in the state of a water-soluble dispersion during the manufacturing process, and is insoluble in NMP. Therefore, there has been a problem that preparation of a coating material (a slurry) and fabrication of an electrode plate may be impossible in an NMP system.

Besides, in the techniques described in Patent Documents 2 to 4, styrene-butadiene rubber is not much soluble in N-methylpyrrolidone, so that it is difficult for the smooth rubber effect to be reflected on the negative electrode plate in a favorable manner like in the case of the water-soluble dispersion.

On the contrary, polyvinylidene fluoride which is a crystalline polymer is insoluble in water. Therefore, where polyvinylidene fluoride is applied to a water-soluble slurry, it is difficult for its effect to be reflected on the negative electrode plate in a favorable fashion like in the case of dispersion in N-methylpyrrolidone.

Incidentally, a styrene-butadiene rubber powder can be converted into particulates having a particle size on the level of several micrometers if its terminal groups are modified with the nitrile group or the like. However, this conversion treatment is normally difficult to carry out. In view of this difficulty and from the viewpoints of handleability during manufacturing process and shelf stability, the styrene-butadiene rubber powders are commercialized in the state of having been isolated as water-soluble dispersions after polymerization in a solvent. Accordingly, a styrene-butadiene rubber power turned into particulates is poor in availability on a market basis.

Further, in the technique described in Patent Document 5, carboxymethyl cellulose is insoluble in N-methylpyrrolidone, which is an organic solvent. Therefore, in fabricating a negative electrode plate from a slurry using N-methylpyrrolidone as a dispersant, it may be impossible to obtain various effects such as the function as a molding agent for the negative electrode composition layer as above-mentioned.

Furthermore, in lithium ion secondary cells using a carbon material for the negative electrode, putting of which to practical use has been contrived at present, the volume density of a negative electrode composition layer is about 1.8 g/cc, and bringing the density close to a true density of 2.2 g/cc is not easy to achieve.

In fact, when the volume density approaches a high value of about 90% of the composition layer true density (namely, when the composition layer volume density approaches 1.95 g/cc), such defects as cutting of the negative electrode plate and peeling or cracking of the composition layer would become observed, even where the thickness of a copper foil widely used as the negative electrode current collector is 12 µm, for example. This matters particularly when it is attempted to make the copper foil thinner in order to obtain a higher capacity.

Thus, there is a need for a negative electrode for a nonaqueous electrolyte secondary cell such that the volume density of a negative electrode composition layer can be increased, stable negative electrode characteristics can be exhibited and a higher capacity can be promised, a method of manufacturing the negative electrode, and a nonaqueous electrolyte secondary cell using the negative electrode.

In order to meet the above-mentioned need, the present inventors made intensive and extensive investigations, and found out that the above-mentioned need can be fulfilled by use of a predetermined surfactant. Based on the finding, the present application has been completed.

In accordance with an embodiment, there is provided a negative electrode for a nonaqueous electrolyte secondary cell, including:

a negative electrode active material layer containing a negative electrode active material, (A) a polyvinylidene fluoride component including polyvinylidene fluoride and/or a derivative having polyvinylidene fluoride as a main chain, (B) a styrene-butadiene component including a styrene-butadiene polymer and/or a derivative having a styrene-butadiene polymer as a main chain, (C) a nonionic surfactant having an HLB of 10 to 15, and (D) N-methylpyrrolidone; and a foil-shaped negative electrode current collector provided with the negative electrode active material layer on at least one principal surface of the collector.

Besides, in accordance with another embodiment of the present application, there is provided a method of manufacturing a negative electrode for a nonaqueous electrolyte secondary cell, the negative electrode including:

a negative electrode active material layer containing a negative electrode active material, (A) a polyvinylidene fluoride component including polyvinylidene fluoride and/or a derivative having polyvinylidene fluoride as a main chain, (B) a styrene-butadiene component including a styrene-butadiene polymer and/or a derivative having a styrene-butadiene polymer as a main chain, (C) a nonionic surfactant having an HLB of 10 to 15, and (D) N-methylpyrrolidone; and a foil-shaped negative electrode current collector provided with the negative electrode active material layer on at least one principal surface of the collector, the method including the steps of:

preparing a negative electrode composition slurry which contains the components (A) to (D) and has the component (D) as a dispersant; and coating at least one principal surface of the negative electrode current collector with the negative electrode composition slurry, followed by drying and a heat treatment.

Further, in accordance with a further embodiment, there is provided a nonaqueous electrolyte secondary cell including: a positive electrode having a foil-shaped positive electrode current collector provided with a positive electrode active material layer on at least one principal surface of the positive electrode current collector; a negative electrode having a foil-shaped negative electrode current collector provided with a negative electrode active material layer on at least one principal surface of the negative electrode current collector; a separator for avoiding contact between the positive electrode and the negative electrode; and a nonaqueous electrolyte solution operable to take part in electrode reactions on the positive electrode and the negative electrode, wherein the negative electrode active material layer contains a negative electrode active material, (A) a polyvinylidene fluoride component including polyvinylidene fluoride and/or a derivative having polyvinylidene fluoride as a main chain, (B) a styrene-butadiene component including a styrene-butadiene polymer and/or a derivative having a styrene-butadiene polymer as a main chain, (C) a nonionic surfactant having an HLB of 10 to 15, and (D) N-methylpyrrolidone.

According to an embodiment, a predetermined surfactant is used, which makes it possible to provide a negative electrode for a nonaqueous electrolyte secondary cell such that the volume density of a negative electrode composition layer can be increased, stable negative electrode characteristics can be exhibited, and a higher capacity can be promised. It is also made possible to provide a method of manufacturing the negative electrode, and a nonaqueous electrolyte secondary cell using the negative electrode.

Additional features and advantages are described herein, and will be apparent from the following Detailed Description and the figures.

DETAILED DESCRIPTION

Figure 1A:
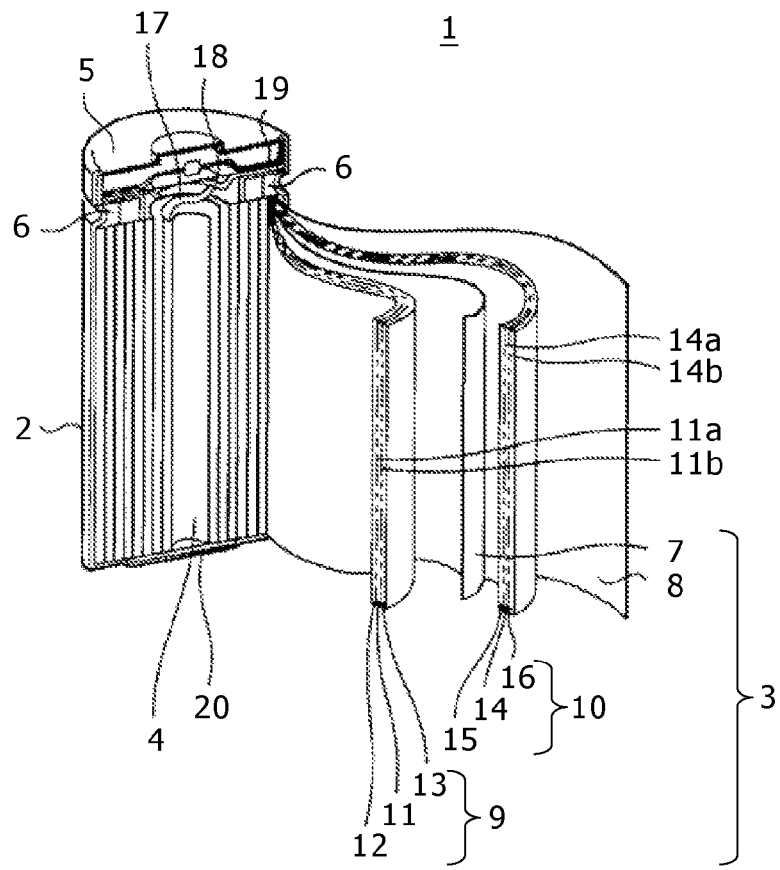
FIGS. 1A and 1B are respectively an exploded perspective view and a sectional view for illustrating an embodiment of a nonaqueous electrolyte secondary cell according to an embodiment.

A negative electrode for a nonaqueous electrolyte secondary cell according to an embodiment of the present application will be described below.

As above-mentioned, the negative electrode for a nonaqueous electrolyte secondary cell according to an embodiment has a negative electrode current collector which is foil-like in shape, and a negative electrode active material layer. The negative electrode active material layer is formed on at least one principal surface of the negative electrode current collector, specifically, on a face-side surface and/or a back-side surface of the negative electrode current collector.

In addition, the negative electrode active material layer is formed from a negative electrode composition slurry to be described later, and contains a negative electrode active material, (A) a polyvinylidene fluoride component, (B) a styrene-butadiene component, (C) a nonionic surfactant having a hydrophile-lipophile balance (HLB) of 10 to 15, and (D) N-methylpyrrolidone.

<Negative Electrode Current Collector>

The negative electrode current collector is foil-like or sheet-like in shape, and is composed of a metallic foil such as a copper foil, a nickel foil, and a stainless steel foil, the thickness of which is typically 7 to 20 µm. The negative electrode current collector may be produced by electrolytic deposition, or may be produced by subjecting a foil core member to a rolling treatment.

<Negative Electrode Active Material Layer>

The negative electrode active material layer contains the components (A) to (D), as above-mentioned, and is formed on the face-side surface and/or the back-side surface (corresponding to an inside surface and/or an outside surface in an electrode roll body to be described later).

Here, in an actual cell manufacturing process, normally, a plurality of negative electrodes (negative electrode plates) are produced from a single foil-shaped negative electrode current collector (negative electrode current collector sheet). In other words, a plurality of negative electrode active material layers are formed, for example, on the face-side surface of a single foil-shaped negative electrode current collector.

In addition, each of the negative electrode active material layers has a coating starting end part (where coating is started) and a coating finishing end part (where coating is finished (stopped)) corresponding to a coating process for coating with a negative electrode composition slurry. Besides, a non-coated part corresponding to a non-coating phase of an intermittent coating operation is present between the adjacent negative electrode active material layers. Incidentally, in the non-coated part, the foil-shaped negative electrode current collector is exposed. Normally, further, the coating starting end part and the coating finishing end part are adjacent to the exposed part of the foil-shaped current collector.

[Negative Electrode Active Material]

Examples of the negative electrode active material include carbonaceous materials capable of doping and dedoping (adsorption and desorption) of lithium, metals capable of alloying with lithium, alloy compounds containing any of these metals, etc. In the present application, a carbonaceous material is used as the negative electrode active material.

Examples of the carbonaceous material include difficulty graphitizable carbon, graphites such as artificial graphite, natural graphite, etc., pyrolytic carbons, cokes (pitch coke, needle coke, petroleum coke, etc.), vitreous carbons, organic polymer fired materials (materials obtained by carbonization of phenol resin, furan resin, etc. by firing at an appropriate temperature), active carbon, and fibrous carbon, which may be used either singly or in arbitrary combination Incidentally, doping of the negative electrode active material layer with lithium may be electrochemically conducted in a cell after fabrication of the cell. Alternatively, the doping may be carried out after or before fabrication of a cell by supplying lithium from a positive electrode or a lithium source other than the positive electrode, or by electrochemical doping. Further, a lithium-containing material may be synthesized at the time of synthesizing a negative electrode active material, or lithium may be incorporated in a negative electrode active material at the time of fabricating a cell.

[(A) Polyvinylidene Fluoride Component]

Examples of the material which can be used as the component (A) include polyvinylidene fluoride (hereinafter sometimes abridged to "PVdF") and derivatives having PVdF as a main chain. Normally, the component (A) functions as a binder in the negative electrode or in the negative electrode active material layer.

Examples of the derivatives having PVdF as a main chain include modified materials of PVdF, vinylidene fluoride copolymers obtained by copolymerization of vinylidene fluoride with an unsaturated dibasic acid monoester, silane-modified materials of vinylidene fluoride copolymers, and copolymer (PTFE-HFP) of tetrafluoroethylene and hexafluoropropylene (HFP).

Incidentally, these PVdF derivatives may be used in mixture of two or more of them or in mixture with PVdF.

[(B) Styrene-butadiene Component]

Examples of the component (B) include styrene-butadiene rubber (hereinafter sometimes abridged to "SBR") and derivatives having SBR as a main chain. Normally, the component (B) functions as a softening agent in the negative electrode or in the negative electrode active material layer.

Examples of the derivatives having SBR as a main chain include derivatives obtained through modification with a carboxylic acid salt such as lithium carboxylate, sodium carboxylate, etc.

Incidentally, these SBR derivatives may be used either in mixture of two or more of them or in mixture with SBR.

[(C) Nonionic Surfactant With HLB of 10 to 15]

The component (C) is not particularly limited insofar as it is a surfactant having an HLB of 10 to 15. Examples of the component (C) include polyoxyalkylene alkyl ethers, polyoxyalkylene alkylphenyl ethers, polyoxyalkylene branched decyl ethers, and arbitrary mixtures of them.

Preferred examples of the polyoxyalkylene alkylphenyl ethers include polyoxyethylene alkylphenyl ethers; preferred examples of the polyoxyalkylene branched decyl ethers include polyoxyethylene isodecyl ether, polyoxyalkylene isotridecyl ethers, and polyoxyethylene isotridecyl ether.

If the HLB is less than 10 or more than 15, the negative electrode composition slurry for forming the negative electrode active material layer would aggregate and, therefore, cannot be applied uniformly to the negative electrode current collector. Besides, in this case, the negative electrode active material layer obtained would be insufficient in peel strength or tensile strength.

Incidentally, anionic surfactants and cationic surfactants are inappropriate, since they lead to aggregation of the negative electrode composition slurry.

[(D) N-Methylpyrrolidone]

N-Methylpyrrolidone (hereinafter sometimes abridged to "NMP") as the component (D) functions as a solvent (dispersant) of the negative electrode composition slurry.

[(E) Hydrophobic Cellulose Component]

Examples of the hydrophobic cellulose component as the component (E) include methyl cellulose and hydroxycellulose, which may be used in mixture.

The component (E), which is not an indispensable component of the negative electrode for the nonaqueous electrolyte secondary cell according to an embodiment, functions as a thickener of the negative electrode composition slurry to be described later.

As above-mentioned, the negative electrode for the nonaqueous electrolyte secondary cell according to an embodiment contains the components (A) to (D) as indispensable components, with the component (E) as an optional component, and, further, other additives than the component (E) may also be incorporated in the negative electrode.

The negative electrode for the nonaqueous electrolyte secondary cell as above-described realizes stable negative electrode properties without any trouble or inconvenience as a negative electrode, even when the volume density of the negative electrode active material layer is increased to a value close to the true density of the negative electrode active material layer. Therefore, the nonaqueous electrolyte secondary cell fabricated by use of this negative electrode is excellent in the degree of freedom in design, and, in regard of its capacity and characteristics, the cell shows little loss on a design basis attendant on an increase in the volume density.

For instance, in a negative electrode using a carbon material as the negative electrode active material, the above-mentioned merits can be obtained even when the volume density is as high as about 90% of the true density of the negative electrode active material layer (namely, even when the volume density of the negative electrode active material layer is about 1.95 g/cc).

In addition, specifically, a good negative electrode being flat and having a uniform thickness over the whole part thereof, particularly with little ruggedness at coating starting end parts and coating finishing (stopping) end parts in an intermittent coating thereof can be obtained. This makes it possible to avoid such problems as damage or rupture due to accumulation of a press pressure at a non-coated part of the negative electrode.

Now, a method of manufacturing the negative electrode for the nonaqueous electrolyte secondary cell according to an embodiment will be described below.

The manufacturing method includes the steps of preparing a negative electrode composition slurry containing the above-mentioned components (A), (B), (C) and the component (D) as a dispersant, optionally with the component (E) (composition slurry preparation step), and coating at least one principal surface of a negative electrode current collector with the negative electrode composition slurry, followed by drying and a heat treatment (active material layer forming step), to thereby manufacture the negative electrode for the nonaqueous electrolyte secondary cell as above-described.

<Negative Electrode Composition Slurry Preparation Step>

[Preparation and Use of Water-soluble Dispersion as Component (B)]

In the composition slurry preparation step, normally, the component (B) is used in the state of a water-soluble dispersion. This makes it possible to make the most of a dispersion state having been turned into a micelle colloid more stable to the dispersant than the SBR particulate powder used in Patent Document 3 and the like. Besides, this makes it possible to enhance availability of materials on a market basis and, hence, to reduce cost.

Incidentally, the preparation of the water-soluble dispersion of the component (B) (SBR component) is not particularly limited, and may be carried out following a method according to the related art.

[Modification of the Dispersion of Component (B)]

The modification of the dispersion is carried out by adding the nonionic surfactant as the above-mentioned component (C), whereby the component (B) (SBR component) of the water-soluble dispersion is transferred into a dispersion having the component (D) (NMP) as a dispersant (this dispersion will sometimes be referred to as "SBR modified dispersion").

[Preparation of NMP Dispersion of Component (A)]

This step is carried out by dispersing or dissolving the component (A) (PVdF component) in the component (D) (NMP), to obtain an NMP dispersion of the PVdF component (this dispersion will sometimes be referred to as "PVdF-NMP dispersion").

The PVdF component is well soluble in NMP. Therefore, the PVdF-NMP dispersion can be obtained by adding the PVdF component powder to NMP, followed by mixing according to an ordinary method.

[Mixing of Dispersions and Addition of Active Material]

This step is carried out by mixing the SBR modified dispersion and the PVdF-NMP dispersion which have been obtained as above-described.

Incidentally, the negative electrode active material may be added to either of the two dispersions, and the addition may be carried out during or after mixing of both the dispersions. Besides, this process may be carried out by initially using NMP in an amount less than the prescribed amount, and diluting the dispersion mixture with NMP during or after mixing of the dispersions, so as to bring the amount of NMP to the prescribed amount.

By such treatments, a negative electrode composition slurry having good slurry properties can be obtained. This point will be described later.

[Addition of Component (E)]

The addition of the hydrophobic cellulose component as the component (E) is not indispensable, but this addition offers the effect as described in Patent Document 5.

Methyl cellulose and hydroxycellulose, which are hydrophobic celluloses, are soluble in NMP, unlike carboxymethyl cellulose (CMC), and can therefore be used preferably in the method of manufacturing a nonaqueous electrolyte secondary cell according to an embodiment.

Incidentally, such a component (E) may be mixed into a solution or dispersion containing NMP as a dispersant. In this case, a hydrophobic cellulose dispersion containing the hydrophobic cellulose dispersed or dissolved in NMP may be prepared, and this dispersion may be added to the negative electrode composition slurry after mixing of the above-mentioned dispersions. Alternatively, the hydrophobic cellulose may be directly added to the above-mentioned SBR modified dispersion or PVdF-NMP dispersion or to the negative electrode composition slurry.

The use of the negative electrode composition slurry as above-described offers the following merits.

In this embodiment, the SBR modified dispersion is prepared and used. The water-soluble SBR dispersion used for this preparation is produced by separating and extracting into a water layer an SBR polymer in the state of being polymerized in a predetermined solvent in the manufacturing process of SBR. Therefore, a high degree of dispersion is ensured, and a better dispersed state can be obtained, as compared with the case where an SBR powder made into producible particulates such as flaky particulates (Patent Document 3 or the like) is dissolved directly in NMP.

Incidentally, SBR is low in solubility in NMP, so that SBR has to be turned into particulates in order to obtain a good dispersion thereof in NMP. However, powders of not only SBR but also resins in general have a risk of dust combustion or explosion, and, therefore, they are not suited to turning into particulates. In view of this, as an approach to safe utilization of a resin in the state of a high degree of dispersion of particulates, those resin systems obtained by a method wherein a resin polymerized in a solvent is isolated and extracted as a water-soluble dispersion thereof are commercialized by manufacturers.

As above-mentioned, in this embodiment, the waters-soluble dispersion of the SBR component is utilized, and it is modified into the NMP dispersion by use of a predetermined surfactant, whereby the SBR component can be dispersed or dissolved in NMP while maintaining a highly dispersed state. Consequently, a stable negative electrode composition slurry for a lithium ion secondary cell can be provided.

In addition, by intimately mixing the above-mentioned SBR modified dispersion with the PVdF-NMP dispersion, a mixed slurry can be prepared while maintaining both the dispersions in a favorably dispersed state. Accordingly, the advantages of both the components, such as the strong binding force of polyvinylidene fluoride, which is a crystalline polymer, and flexibility of the styrene-butadiene rubber can be exhibited appropriately.

This makes it possible to avoid such problems as damage or rupture at a non-coated part of the negative electrode current collector due to accumulation of a press pressure, which would otherwise be generated when a high volume density in excess of 80% of the true density of the negative electrode active material layer to be formed is aimed at, according to the progress of an increase in cell capacity.

Incidentally, where the SBR modified dispersion and the PVdF-NMP dispersion are mixed in an appropriate ratio, both rubber elasticity of the SBR and crystalline high adhesive force of the PVdF can be realized even when the volume density of the negative electrode active material layer is as high as about 90% of the true density.

Further, where the hydrophobic slurry of methyl cellulose or hydroxypropyl methyl cellulose or the like is mixed in the above-mentioned negative electrode composition slurry, rheological properties of the slurry are enhanced to bring the system close to a Newtonian viscoelastic system in which variation of viscosity with shear rate is proportional. Consequently, the negative electrode composition slurry shows good spread at the time of its application to the negative electrode current collector, and good responses to the intermittent coating operation is ensured.

Specifically, such a negative electrode composition slurry shows good spread and good cutoff in coating the negative electrode current collector therewith. Thus, the slurry shows satisfactory follow-up to the intermittent coating operation. Consequently, the non-coated parts as well as the coating starting end parts and the coating finishing end parts can be sharply shaped.

Therefore, it is possible to obtain a good negative electrode active material layer with little ruggedness at the coated surface, the non-coated parts, the coating starting end parts and the coating finishing end parts. This contributes to an increase in volume density and an increase in capacity, in the nonaqueous electrolyte secondary cell. Further, it is possible to obviate damage or rupture at a non-coated part due to accumulation of a press pressure.

Incidentally, carboxymethyl cellulose (CMC) is insoluble in N-methylpyrrolidone, which is an organic solvent. Therefore, a negative electrode produced by use of a slurry having N-methylpyrrolidone as a dispersant cannot exhibit the above-mentioned functions of the negative electrode molding agent and the like.

On the other hand, methyl cellulose and hydroxycellulose can be dispersed or dissolved in N-methylpyrrolidone, though use thereof with water is difficult because of generation of a large quantity of bubbles in water. Therefore, in the case where a negative electrode is produced by use of a slurry having N-methylpyrrolidone as a dispersant, methyl cellulose and hydroxycellulose function as a negative electrode molding agent, and make it possible to enhance the negative electrode characteristics obtained. Further, an improvement in charge-discharge characteristics after a heat treatment as well as a gas generation suppressing effect and the like can be realized.

In the above-mentioned negative electrode composition slurry, the contents of the components can be appropriately changed according to the negative electrode characteristics and cell characteristics desired. Normally, however, it is desirable that the total amount of the PVdF component (A) and the SBR component (B) is 1.5 to 5 parts by weight, preferably 2 to 4 parts by weight, based on 100 parts by weight of the negative electrode active material.

If the total amount of both the components is less than 1.5 parts by weight, the negative electrode active material obtained may be peeled off. On the other hand, if the total amount of both the components exceeds 5 parts by weight, the porosity of the negative electrode active material obtained may be spoiled, and charge-discharge characteristics may be lowered.

Incidentally, the mixing ratio PVdF/SBR of the PVdF component (A) to the SBR component (B), by weight, is preferably in the range from 9.5/0.5 to 2/8, more preferably from 9/1 to 3/7.

As the density of the negative electrode active material layer after molding by rolling approaches the true density, the restoring force due to rubber elasticity of the SBR component and crystal hardening of the PVdF component come to act as reaction forces in the negative electrode active material layer. This results in that it is difficult, without increasing the proportion of PVdF, to maintain the adhesive strength of the negative electrode active material layer.

In addition, methyl cellulose or hydroxypropyl methyl cellulose (E) having a cellulose skeleton as a main chain is desirably mixed in an amount of 0.2 to 1.5 parts by weight, based on 100 parts by weight of the negative electrode active material.

If this amount is less than 0.2 part by weight, rheological properties of the negative electrode composition slurry obtained may not be improved. Besides, the improving effects on rate characteristics and charge-discharge characteristics arising from a pseudo SEI effect due to side chains or cellulose ring opening upon a heat treatment may not be exhibited. If the amount is more than 1.5 parts by weight, on the other hand, electric resistance may be increased excessively.

Incidentally, the nonionic surfactant (C) is desirably mixed in an amount of 0.2 to 1.5 parts by weight, based on 100 parts by weight of the negative electrode active material.

<Active Material Layer Forming Step>

[Coating Step]

At least one principal surface of the negative electrode current collector, namely, at least one of a face-side surface and a back-side surface of the negative electrode current collector is coated with the negative electrode composition slurry obtained as above-mentioned.

This coating treatment is conducted, for example, by doctor blade, comma direct coating, extrusion nozzle die coating, gravure coating, pull-up system or the like, and it is desirable to use one of these systems equipped with an intermittent coating device.

Incidentally, as above-mentioned, a plurality of negative electrode active material layers are formed on a single negative electrode current collector sheet, and a non-coating phase of an intermittent coating operation is carried out between the negative electrode active material layers.

[Drying Step]

Use of a hot air drying system serving also as a conveying system such as an air floating system is desirable, from the viewpoint of electrode composition layer forming performance. More preferably, a drying system to which heat-removing heating is added, such as far infrared to mid-infrared radiation heating systems, a heating system by passing a direct current through the core member, etc. is used. In addition, the hot air drying is preferably conducted by dividing the drying zone into a number of zones set in different conditions and by controlling the temperature and the quantity of airflow in a form conforming to the dried state.

The temperature may be 80 to 150° C., and the quantity of airflow may be set taking into account the relationship between the solvent vapor pressure and the exhaust flow rate, whereby optimum drying can be achieved.

[Heat Treatment Step]

The heat treatment is preferably carried out in a non-oxidizing atmosphere such as an inert gas or in an evacuated condition. This is for preventing oxidation of the negative electrode current collector, for example, a copper foil and for causing or improving thermal fusing or decomposition of the hydrophobic cellulose component functioning as a thickener, fusing or penetration of PVdF or SBR functioning as a binder in the active material layer, an electrolyte solution absorbing or holding ability arising from formation of pores, and the like.

Here, examples of the inert gas include argon and nitrogen, and the heat treatment temperature is preferable in the range of 100 to 300° C.

In addition, the heat treatment in the evacuated condition is preferably conducted in a vacuum or at a reduced pressure of 1000 Pa or below.

The heating method for this heat treatment is not particularly limited. From the viewpoint of enhancing a thermal decomposition effect on the thickener or enhancing productivity, however, the heating is carried out by a method in which a negative electrode precursor before heat treatment is wound to form a electrode roll body, typically a large-diameter electrode roll body, and a direct current is passed through the electrode roll body to heat it in the non-oxidizing atmosphere or in the evacuated condition.

As a result of such a heat treatment, the charge-discharge characteristics, high-load discharge rate discharge characteristics and low-temperature characteristics of the negative electrode obtained can be enhanced, and the amount of gas generated can be reduced.

[Rolling Step]

The rolling step is not an indispensable step in the method of manufacturing the negative electrode according to an embodiment. However, the negative electrode current collector can be obtained by subjecting a core member for forming the negative electrode to rolling.

In addition, the rolling treatment may be carried out after coating of the core member with the negative electrode composition slurry and drying and the heat treatment are conducted. Alternatively, the rolling treatment may be carried out after coating of the core member with the negative electrode composition slurry and drying are performed; in that case, the heat treatment is carried out after the rolling treatment, whereby the negative electrode according to an embodiment can be obtained.

Incidentally, it is natural that the negative electrode according to an embodiment can be obtained when a negative electrode current collector obtained by rolling the core member is coated with the negative electrode composition slurry, followed by drying and the heat treatment.

[Pressing Step and Cutting Step]

The pressing step also is not an indispensable step. However, a pressing treatment may be carried out after the heat treatment, according to the volume density of the negative electrode electrolyte layer desired.

Meanwhile, the cutting step also is not an indispensable step. However, since a plurality of negative electrode active material layers are normally formed on a single negative electrode current collector, if the thus obtained assembly is cut appropriately, a plurality of negative electrodes can be obtained.

Thus, the cutting step is a step in which an electrode plate having a predetermined current collector foil provided thereon with the active material layers (composition layers) is cut to a electrode plate width conforming to the cell size desired. The electrode plates obtained upon the cutting are used to constitute electrode elements (a group of electrodes).

Now, the nonaqueous electrolyte secondary cell according to an embodiment will be described below.

In this embodiment, the case where a cylindrical cell of the so-called element roll type as illustrated by a partly cut perspective view in FIG. 1A will be described as an example.

First, the configuration of the nonaqueous electrolyte secondary cell according to this embodiment will be described.

In this embodiment, the cell 1 has a configuration in which a roll body 3 (electrode roll body) is disposed inside a top-opened cylindrical cell can 2, with a center pin 4 (not shown) as a center, and the cell can 2 is sealed with a cell lid 5.

The cell can 2 is composed, for example, of a nickel-plated iron can. The roll body 3 has a configuration in which a positive electrode 9 and a negative electrode 10 wound into a roll shape are set facing each other, with an electrolyte-containing wound separator 7 and 8 therebetween.

The cell lid 5 is provided on its inside with a safety valve mechanism 18 together with a heat-sensitive resistor element (PTC (Positive Temperature Coefficient) element), and is attached to the cell can 2 by caulking, with a gasket 6 therebetween. In other words, the inside of the cell can 1 is sealed off by the cell can 2 and the cell lid 5.

The safety valve mechanism 18 is electrically connected to the cell lid 5 through the PTC element. When the internal pressure of the cell reaches or exceeds a predetermined value due to internal shortcircuiting or external heating, for example, an incorporated disk is reversed so as to break the electrical connection between the cell lid 5 and the roll body 3. Here, the heat-sensitive resistor element is an element for restricting current by an increase in its resistance upon a rise in temperature, so as to prevent abnormal heat generation from arising from a large current.

Figure 1B:
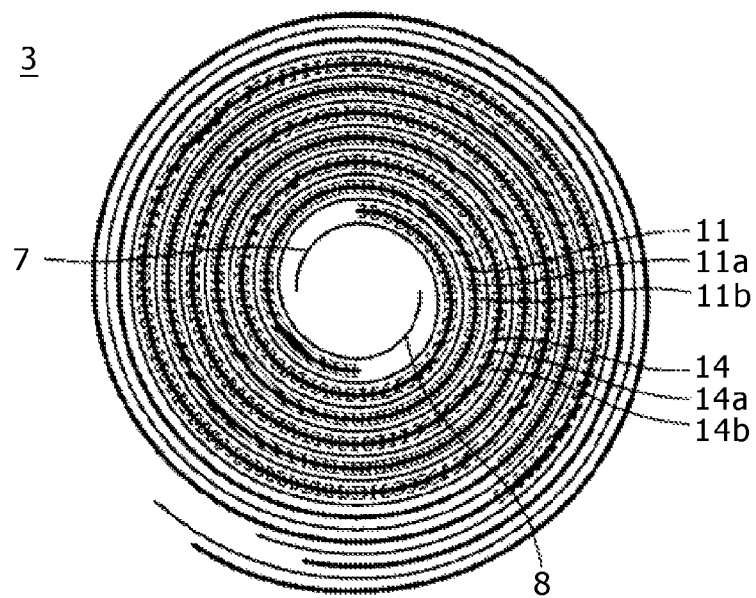

FIG. 1B schematically shows a sectional structure of the roll body 3.

In this embodiment, the roll body 3 has a configuration in which the positive electrode 9 and the negative electrode 10 belt-like (sheet-like) in shape are set facing each other, with the electrolyte-containing separator 7 and 8 therebetween, and the resulting stacked body is wound into a roll form.

A positive electrode lead composed, for example, of aluminum and a negative electrode lead (not shown) composed, for example, of nickel are connected respectively to the positive electrode 9 and the negative electrode 10 of the roll body 3. The positive electrode lead is welded to the safety valve mechanism 18, whereby it is electrically connected to the cell lid 5. The negative electrode lead is electrically connected to the cell can 2 by direct welding to the latter.

Here, the positive electrode 9 has, for example, a positive electrode current collector 11 having a first principal surface 11a to be an inside surface in the roll structure and a second principal surface 11b to be an outside surface in the roll structure. An inside positive electrode active material layer 12 is formed on the side of the first principal surface 11a, and an outside positive electrode active material layer 13 is formed on the side of the second principal surface 11b.

The inside positive electrode active material layer 12 and the outside positive electrode active material layer 13 are preferably formed by selecting a material according to the cell configuration and/or characteristics desired, from materials which are capable of doping and dedoping of lithium as will be described later. Besides, the positive electrode active material layer may not necessarily be formed on both the inside surface and the outside surface in the roll body. The positive electrode current collector 11 can be made, for example, from aluminum, nickel, stainless steel or the like.

In addition, the inside positive electrode active material layer 12 and the outside positive electrode active material layer 13 may contain a positive electrode active material and may optionally contain a conduction assistant, such as a carbonaceous material, and a binder such as polyvinylidene fluoride.

The positive electrode active material is preferably, for example, a lithium-containing metallic compound oxide including lithium and a transition metal, represented for example by a general formula $Li_xMO_2$ and containing a sufficient quantity of lithium (Li). Such a lithium-containing metallic compound oxide is capable of generating a high voltage and, due to its high density, capable of contriving a further enhancement of the secondary cell capacity.

Incidentally, M in the general formula is at least one transition metal, a preferable example being at least one selected from the group consisting of cobalt, nickel, and manganese. The value of x varies depending on the charged/discharged state of the cell, and is normally in the range of $0.05 \leq x \leq 1.10$.

Specific examples of such a lithium-containing metallic compound oxide include $LiCoO_2$ and $LiNiO_2$. As the positive electrode active material, the lithium-containing metallic compound oxides may be used either singly or in combination of two or more of them.

The positive electrode 9 is so formed as to lessen impurities, specifically, foreign metallic components or water, in the inside positive electrode active material layer 12 and the outside positive electrode active material layer 13.

In addition, the inside positive electrode active material layer 12 and the outside positive electrode active material layer 13 of the positive electrode 9 should contain Li in an amount corresponding to a charge/discharge capacity of not less than 250 mAh per 1 g of the negative electrode carbonaceous material in a steady state (for example, after a charge-discharge cycle is repeated about five times). It is preferable that the positive electrode active material layers 12 and 13 contain Li in an amount corresponding to a charge/discharge capacity of not less than 300 mAh, more preferably not less than 330 mAh, in the above-mentioned meaning.

Incidentally, Li may not necessarily be supplied entirely from the inside positive electrode active material layer 12 and the outside positive electrode active material layer 13. For example, it suffices that in the solvent to be described later, Li is present in an amount corresponding to a charge/discharge capacity of not less than 250 mAh per 1 g of the carbonaceous material in the cell system. This amount of Li is appropriately selected according to measurement of the discharge capacity of the cell.

On the other hand, the materials constituting the negative electrode 10, the inside negative electrode active material layer 15 and the outside negative electrode active material layer 16 and the like factors have already been described above, and, therefore, descriptions thereof are omitted here.

The negative electrode 10 is so formed as to lessen impurities, specifically, foreign metallic compounds or water, in the inside negative electrode active material layer 15 and the outside negative electrode active material layer 16.

Besides, the doping of the negative electrode active material layer with lithium may be electrochemically conducted in the cell after fabrication of the cell, or may be electrochemically conducted by supplying lithium from the positive electrode or a lithium source other than the positive electrode after or before the fabrication of the cell. Further, a lithium-containing material may be synthesized at the stage of synthesizing various materials, and lithium may be thereby incorporated into the negative electrode at the time of fabricating the cell.

The separators 7 and 8 are provided for preventing short-circuiting from occurring due to physical contact between the positive electrode 9 and the negative electrode 10, while permitting lithium ions to pass therethrough. The separators 7 and 8 are each composed, for example, of a microporous polyolefin film such as polyethylene film, polypropylene film, etc.

It is preferable that the separators 7 and 8 have the function of cutting off currents by a rise in the resistance thereof through closure of their pores by heat fusing at or above a predetermined temperature (e.g., 120° C.) for the purpose of securing safety.

In addition, the separators 7 and 8 are impregnated with an electrolyte solution (not shown). In this embodiment, the electrolyte solution contains, for example, a nonaqueous solvent and a lithium salt as an electrolyte salt dissolved in the solvent, and may optionally contain various additives.

Examples of the nonaqueous solvent include propylene carbonate, ethylene carbonate, diethyl carbonate, methyl ethyl carbonate, 1,2-dimethoxyethane, 1,2-diethoxyethane, γ-butyrolactone, tetrahydrofuran, 2-methyltetrahydrofuran, 1,3-dioxolan, 4-methyl-1,3-dioxolan, diethyl ether, sulfolane, methylsulfolane, acetonitrile, propylnitrile, anisole, acetic acid esters, propionic acid esters, etc.

Incidentally, these nonaqueous solvents may be used either singly or in mixture of two or more of them.

In the case of using two or more nonaqueous solvents in mixture, particularly, it is preferable to use ethylene carbonate as a main solvent and use an asymmetric chain carbonic acid ester, e.g., methyl ethyl carbonate or methyl propyl carbonate, as a second component added to the main solvent.

Further, a mixed solvent of methyl ethyl carbonate and dimethyl carbonate may also be used. In this case, the mixing ratio of ethylene carbonate to the second component solvent by volume is preferably in the range from 7:3 to 3:7. Besides, in the case of using the above-mentioned mixed solvent as the second component solvent, the volume ratio of methyl ethyl carbonate to dimethyl carbonate is preferably in the range from 2:8 to 9:1.

The addition of the second component suppresses decomposition of the main solvent. Beside, the addition of the second component enhances electric conductivity, thereby improving current characteristics, lowers the solidification point of the electrolyte solution, thereby improving low-temperature characteristics, and lowers reactivity with lithium metal, thereby improving safety.

As the electrolyte salt, $LiPF_6$ is preferably used, but any of those which are ordinarily used for this type of cells can be used. Examples of lithium salts which can be used as the electrolyte salt include $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$, $LiN(C_4F_9SO_2)(CF_3SO_2)$, $LiCl$ and $LiBr$. Among these, preferred are $LiClO_4$, $LiAsF_6$, $LiPF_6$, $LiBF_4$, $LiCH_3SO_3$, $LiCF_3SO_3$, $LiN(CF_3SO_2)_2$, $LiN(C_2F_5SO_2)_2$, and $LiN(C_4F_9SO_2)(CF_3SO_2)$, and particularly preferred are $LiPF_6$ and $LiBF_4$.

These lithium salts may be used either singly or in mixture of two or more of them.

Now, the method of manufacturing the negative electrode according to this embodiment will be described below, taking as an example the case of obtaining the nonaqueous electrolyte secondary cell as above-described.

The method of manufacturing the negative electrode according to this embodiment is applicable also to the positive electrode constituting the cell. In addition, as above-mentioned, the materials and their amounts and the like may also be appropriately selected according to the purpose. In this embodiment, an example of producing the negative electrode using graphite as a main component of the negative electrode active material will be described.

First, natural graphite is pulverized by use of a hammer mill, a pin mill, a ball mill, a jet mill or the like, to obtain graphite particles to be finally a main component of the active material layers in the cell.

Specifically, in the case of using a hammer mill for example, pulverization is preferably carried out at a rotating speed of 4000 to 5000 rpm for at least 20 min. Incidentally, supply of the natural graphite and discharge of the graphite particles are desirably carried out by a technique of entraining the graphite particles into an air stream.

The graphite particles thus obtained are admixed with predetermined amounts of respective N-methylpyrrolidone dispersions of polyvinylidene fluoride, styrene-butadiene rubber (SBR), and hydroxypropyl methyl cellulose as a binder and a thickener in a predetermined order, to obtain a pasty kneaded material (slurry) containing these components in N-methyl-2-pyrrolidone (NMP) serving as a solvent for the negative electrode composition.

Here, the N-methylpyrrolidone dispersion of the styrene-butadiene rubber is prepared by a method in which a predetermined amount of a polyoxyethylene isotridecyl ether surfactant is added to a commercially available water-soluble dispersion liquid (product by JSR), and, after stirring, dilution with N-methylpyrrolidone is conducted to obtain a dispersion having N-methylpyrrolidone as a dispersant (SBR modified dispersion). In this manner, a kneaded material preparation step is carried out.

Next, the thus obtained kneaded material is applied to a copper foil current collector serving as an example of a sheet-shaped (belt-shaped) negative electrode current collector. Thereafter, a firing treatment of drying, for example, at a temperature of 80 to 110° C. in a nitrogen or inert gas by use of spray drier is conducted, thereby drying the kneaded material and firing and spreading the binder, to obtain a negative electrode having an active material layer formed on the current collector. If necessary, press molding may be carried out according to the volume density desired. In this manner, a coating drying, rolling and heat treatment step is carried out.

EXAMPLES

Now, the present application will be described more in detail below by showing Examples, but the application is not to be limited to the Examples.

Examples 1 to 35

Nonaqueous electrolyte secondary cells in examples were manufactured according to the following procedure.

First, a negative electrode was produced according to the above-mentioned procedure.

Specifically, respective N-methylpyrrolidone dispersions were prepared by using N-methylpyrrolidone as a solvent for constituting a kneaded material, polyvinylidene fluoride and styrene-butadiene rubber as binders, a polyoxyethylene isotridecyl ether surfactant, and hydroxypropyl methyl cellulose as a thickener. Thereafter, the dispersions were kneaded with an active material in a predetermined procedure, to prepare a slurry. The slurry was applied to a metallic foil core member, followed by drying, pressing and a heat treatment, to obtain a negative electrode plate. Incidentally, the heat treatment was carried out at 180° C. in a nitrogen atmosphere.

In Examples 1 to 35, as shown in Table 1 below, the conditions in regard of the total amount of polyvinylidene fluoride and styrene-butadiene rubber, their presence ratio (contents), the amount of hydroxypropyl methyl cellulose as the thickener, and the presence (represented by "done" in the table) or absence (represented by "-" in the table) of a heat treatment were changed.

Incidentally, as for the styrene-butadiene rubber, the state of the water-soluble dispersion was utilized and a predetermined surfactant was used so as to modify it into a dispersion based mainly on N-methylpyrrolidone, which was used.

The amount of the used polyoxyethylene isotridecyl ether surfactant is about 1/20 times the amount of the styrene-butadiene rubber, and the mixture is solidified after drying; therefore, the amount of the surfactant is included in the amount of the styrene-butadiene rubber.

Subsequently, 0.5 mol of lithium carbonate and 1 mol of cobalt carbonate were mixed, and the mixture was fired at 900° C. in air for five hours, to obtain $LiCoO_2$. The thus obtained $LiCoO_2$ was pulverized, to obtain a $LiCoO_2$ powder having a 50% cumulative particle diameter of 15 μm as measured by a laser diffraction method.

Thereafter, 91 parts by weight of a mixture prepared by mixing 95 parts by weight of a $LiCoO_2$ powder with 5 parts by weight of a lithium carbonate powder, 6 parts by weight of graphite as a conductive agent, and 3 parts by weight of polyvinylidene fluoride as a binder were mixed with each other to prepare a positive electrode composition, which was dispersed in a solvent (N-methylpyrrolidone) to obtain a slurry (pasty material).

The positive electrode composition slurry was uniformly applied to both sides of a belt-like aluminum foil having a thickness of 20 μm to finally be a positive electrode current collector. The coating was followed by drying and compression molding, to produce a sheet-shaped positive electrode.

Next, the negative electrode and the positive electrode thus produced were stacked together with separators each composed of a microporous polypropylene film having a thickness of 25 μm in the order of the negative electrode, the separator, the positive electrode and the separator, and the resulting stacked body was wound (rolled) many times, to produce a spiral roll body measuring 18 mm in outside diameter.

The spiral roll body was accommodated in a cell can made of nickel-plated iron, and insulating plates were disposed on upper and lower end faces of the spiral roll body. A positive electrode lead made of aluminum was led out from the positive electrode current collector, and welded to the cell lid. A negative electrode lead made of nickel was led out from the negative electrode current collector, and welded to the bottom of the cell can.

Thereafter, the cell can with the roll body accommodated therein was filled with an electrolyte solution composition prepared by dissolving $LiPF_6$ in a nonaqueous solvent (e.g., an equal-volume mixed solvent of ethylene carbonate and diethyl carbonate) in a concentration of 1 mol/dm$^3$, to impregnate the positive electrode and the negative electrode and the separators with the electrolyte solution composition.

Thereafter, the cell lid was caulked to the cell can in the condition where an insulating sealing gasket coated thereon with asphalt is interposed between the cell lid and the cell can, whereby the safety valve mechanism having a circuit breaker function and the PTC element and the cell lid were fixed, to obtain a cell the inside of which is sealed airtight.

Incidentally, the respective cells thus obtained in the examples are cells having a cell capacity of 2350 mAh as measured according to ICR18650 described in JIS C8711.

<Evaluation of Performances>

The nonaqueous electrolyte secondary cells obtained in the examples as above were served to the following evaluations. The evaluation results are also given in Table 1 below.

[Binding]

The binding was evaluated by a 180 degree (angle) peel test. In Table 1, "○" means that peeling did not occur, and "x" means that peeling occurred.

[Flexibility (Anti-Damage)]

The negative electrode active material layer after pressing was peeled by use of a solvent, and the level of damage or rupture at a non-coated part of the current collector due to accumulation of a press pressure was evaluated through foil surface observation and/or a tensile test.

[Cycle Characteristic]

The cycle characteristic as one of cell characteristics was evaluated by a cycle test (1C charge, 1C discharge) at 20° C.

Figure 2:
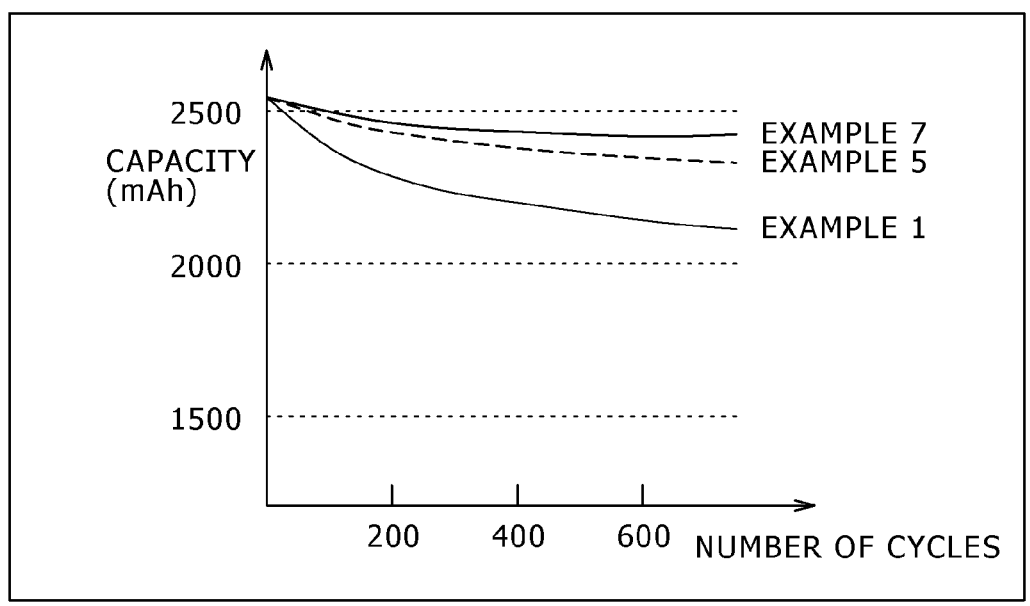
FIG. 2 is a graph showing cycle characteristics of secondary cells.

For Examples 1, 5 and 7, the cycle test results are represented by a graph shown in FIG. 2.

TABLE 1

| | Hydroxypropyl methyl cellulose | | | | | | | | |
|---|---|---|---|---|---|---|---|---|---|
| | Presence ratio of solid[1] (wt. %) | Presence ratio of PVdF/SBR | | Presence ratio of solid[1] (wt. %) | Heat treatment of electrode In $N_2$, at 180° C. | Volume density of composition (g/cc) | Evaluation | | |
| | | | | | | | | Flexibility | |
| | PVdF + SBR | PVdF | SBR | HPMC[2] | | | Binding | (Anti-damage) | Cycle | Overall |
| Example 1 | 5.5 | 9 | 1 | 0 | done | 1.9 | ○ | ○ | x | x |
| Example 2 | 5.0 | 9 | 1 | 0 | done | 1.9 | ○ | ○ | ○ | ○ |
| Example 3 | 4.0 | 9 | 1 | 0 | done | 1.9 | ○ | ○ | ○ | ○ |
| Example 4 | 3.0 | 10 | 0 | 0 | — | 1.9 | ○ | x | Δ | x |
| Example 5 | 3.0 | 10 | 0 | 1 | — | 1.9 | ○ | ○ | ○ | ○ |
| Example 6 | 3.0 | 9.5 | 0.5 | 0 | — | 1.9 | ○ | x | Δ | x |
| Example 7 | ↓ | ↓ | ↓ | 1 | done | 1.9 | ○ | ○ | ○ | ○ |
| Example 8 | ↓ | 9 | 1 | 0 | — | 1.9 | ○ | ○ | ○ | ○ |
| Example 9 | ↓ | 9 | 1 | 0 | done | 1.9 | ○ | ○ | ○ | ○ |
| Example 10 | ↓ | 5 | 5 | 0 | — | 1.9 | ○ | ○ | ○ | ○ |
| Example 11 | ↓ | 5 | 5 | 1 | done | 1.9 | ○ | ○ | ○ | ○ |
| Example 12 | ↓ | 3 | 7 | 0 | — | 1.9 | ○ | ○ | ○ | ○ |
| Example 13 | ↓ | 2 | 8 | 0 | — | 1.9 | ○ | ○ | ○ | ○ |
| Example 14 | ↓ | ↓ | ↓ | 1 | done | 1.9 | ○ | ○ | ○ | ○ |
| Example 15 | ↓ | 1.5 | 8.5 | 0 | — | 1.9 | x | ○ | Δ | x |
| Example 16 | ↓ | 0 | 10 | 0 | — | 1.9 | x | ○ | Δ | x |
| Example 17 | ↓ | 0 | 10 | 1 | — | 1.9 | ○ | ○ | ○ | ○ |
| Example 18 | 2.0 | 10 | 0 | 0 | — | 1.9 | ○ | x | Δ | x |
| Example 19 | 2.0 | 10 | 0 | 1 | — | 1.9 | ○ | ○ | ○ | ○ |
| Example 20 | 2.0 | 9.5 | 0.5 | 0 | — | 1.9 | ○ | x | Δ | x |
| Example 21 | ↓ | ↓ | ↓ | 1 | done | 1.9 | ○ | ○ | ○ | ○ |
| Example 22 | ↓ | 9 | 1 | 0 | — | 1.9 | ○ | ○ | ○ | ○ |
| Example 23 | ↓ | 9 | 1 | 0 | done | 1.9 | ○ | ○ | ○ | ○ |
| Example 24 | 2.0 | 0 | 10 | 0 | — | 1.9 | ○ | x | Δ | x |
| Example 25 | ↓ | 0 | 10 | 1 | — | 1.9 | ○ | ○ | ○ | ○ |
| Example 26 | 1.5 | 10 | 0 | 0 | — | 1.9 | ○ | x | Δ | x |
| Example 27 | 1.5 | 10 | 0 | 1 | — | 1.9 | ○ | ○ | ○ | ○ |
| Example 28 | 1.5 | 9.5 | 0.5 | 0 | — | 1.9 | ○ | x | Δ | x |
| Example 29 | ↓ | ↓ | ↓ | 1 | done | 1.9 | ○ | ○ | ○ | ○ |
| Example 30 | ↓ | 9 | 1 | 0 | — | 1.9 | ○ | ○ | ○ | ○ |
| Example 31 | ↓ | 9 | 1 | 0 | done | 1.9 | ○ | ○ | ○ | ○ |
| Example 30 | 1.5 | 0 | 10 | 0 | — | 1.9 | ○ | x | Δ | x |
| Example 31 | ↓ | 0 | 10 | 1 | — | 1.9 | ○ | ○ | ○ | ○ |
| Example 32 | 1.0 | 9.5 | 0.5 | 0 | — | 1.9 | x | x | Δ | x |
| Example 33 | ↓ | ↓ | ↓ | 1 | done | 1.9 | x | Δ | ○ | x |
| Example 34 | ↓ | 9 | 1 | 0 | — | 1.9 | x | x | Δ | x |
| Example 35 | ↓ | 9 | 1 | 0 | done | 1.9 | x | x | ○ | x |

Notes -

[1]Presence ratio of solid matter, based on 100 parts by weight of active material.

[2]Hydroxypropyl methyl cellulose

From the results shown in Table 1 and FIG. 2, it is seen that it is preferable for the presence ratio (content) of the total amount of polyvinylidene fluoride as binder (A) and styrene-butadiene rubber polymer as binder (B) to be in the range from 1.5 to 5 parts by weight, based on 100 parts by weight of the active material composition.

If the total amount is less than 1.5 parts by weight, charge-discharge characteristics are lowered due to peeling of the composition layer. If the total amount is more than 5 parts by weight, charge-discharge characteristics are lowered due to hindrance of porosity of the negative electrode active material layer.

In addition, it is seen that it is preferable for the presence ratio (mixing ratio) of polyvinylidene fluoride or a derivative having polyvinylidene fluoride as a main chain as binder (A) to the styrene-butadiene rubber polymer or a derivative having a styrene-butadiene main chain as binder (B), by weight, to be in the range from 9.5/0.5 to 2/8, more preferably in the range from 9/1 to 3/7.

In the case where the proportion of the styrene-butadiene rubber (B) is 0.5, no special problem occurs if the cellulose (E) as a thickener is mixedly present. If the cellulose (E) is not mixedly present, however, the proportion of polyvinylidene fluoride based on the total binder amount increases, so that the negative electrode active material layer becomes harder, possibly resulting in such troubles as damage or rupture at a non-coated part of the current collector due to accumulation of a press pressure or peeling of the composition layer.

This may be interpreted as follows. While the styrene-butadiene rubber (B) naturally is elastic, the cellulose (E) as a thickener also has some degree of elasticity, so that the presence of the cellulose (E) is considered to contribute to good flexibility of the negative electrode active material layer.

In addition, since the slurry is enhanced in rheological properties and in the response to the intermittent coating operation, the shapes of the coated surface and of the coating starting end parts and the coating finishing end parts are improved; particularly, the amount of protuberance at the coating starting end part is reduced to ½ times that in the related art. Thus, an improving effect on damage or rupture of the electrode at the non-coated part due to accumulation of a press pressure is considered to be added in this case.

Reference Examples

By use of various surfactants, a plurality of kinds of negative electrode composition slurries were prepared, and they were evaluated as to coating material forming performance (slurry forming performance). Besides, the negative electrodes obtained by use of the negative electrode composition slurries were evaluated as to peel strength and tensile strength, the results being shown in Table 2 below.

TABLE 2

| Kind | Surfactant | HLB | Coating material forming performance Possible/impossible | State[3] | Peel strength[1] (N/mm$^2$) | Tensile strength[2] (N/mm$^2$) |
|---|---|---|---|---|---|---|
| Nonionic | Polyoxyethylene alkylphenyl ether | 5 | Δ | Agg. | — | — |
| | | 10 | ○ | No agg. | ○[4] | 13 |
| | | 15 | ○ | No agg. | ○ | 16 |
| Nonionic | Polyoxyalkylene alkyl ether | 5 | Δ | Agg. | — | — |
| | | 10 | ○ | No agg. | ○ | 15 |
| | | 15 | ○ | No agg. | ○ | 17 |
| Nonionic | Polyoxyethylene isodecyl ether | 5 | Δ | Agg. | — | — |
| | | 10 | ○ | No agg. | ○ | 15 |
| Nonionic | Polyoxyalkylene isotridecyl ether | 5 | Δ | Agg. | — | — |
| | | 10 | ○ | No agg. | ○ | 15 |
| Nonionic | Polyoxyethylene isotridecyl ether | 5 | Δ | Agg. | — | — |
| | | 10 | ○ | No agg. | ○ | 18 |
| | | 15 | ○ | No agg. | ○ | 20 |
| Anionic | Alkyl ether phosphate | 5 | Δ | Agg. | — | — |
| | | 10 | Δ | Agg. | — | — |
| Cationic | Alkyltrimethyl ammonium salt | 5 | Δ | Agg. | — | — |
| | | 10 | Δ | Agg. | — | — |
| Cationic | Alkylbenzyldimethylammonium salt | 5 | Δ | Agg. | — | — |
| | | 10 | Δ | Agg. | — | — |

Notes -
[1] Measured on Shimadzu AGS-H, 100 N.
[2] Measured on Shimadzu AG-IH, 500 N.
[3] Agg. - Aggregation was observed; No agg. - No aggregation was observed.

For instance, the negative electrode, the method of manufacturing the same and the nonaqueous electrolyte secondary cell according to embodiments are not limited in application to the so-called roll type (wound type) nonaqueous electrolyte secondary cells as shown in the embodiments and examples above, but are applicable also to the so-called stacked type cells and, further, to cells in which the nonaqueous electrolyte is in the form of polymer or gel.

Thus, according to an embodiment, it is possible to realize nonaqueous electrolyte lithium secondary cells which have a negative electrode with a high volume density, are excellent in various cell characteristics such as charge-discharge characteristics, high-rate characteristic, temperature characteristic, etc., ensure suppressed gas generation, and are high in reliability. Such cells are of use, particularly, for personal computers, cellular phones, etc.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A negative electrode for a nonaqueous electrolyte secondary cell, comprising:
   a negative electrode active material layer containing a negative electrode active material, (A) a polyvinylidene fluoride component including polyvinylidene fluoride and/or a derivative having polyvinylidene fluoride as a main chain, (B) a styrene-butadiene component including a styrene-butadiene polymer and/or a derivative having a styrene-butadiene polymer as a main chain, and (C) a nonionic surfactant having a hydrophile-lipophile balance of 10 to 15; and
   a foil-shaped negative electrode current collector provided with the negative electrode active material layer on at least one principal surface of the collector,
   wherein the negative electrode active material layer is formed using a dispersion based mainly on N-methylpyrrolidone.

2. The negative electrode according to claim 1, wherein the negative electrode active material layer further contains (E) a hydrophobic cellulose component including methyl cellulose and/or hydroxycellulose.

3. The negative electrode according to claim 1, wherein the nonionic surfactant (C) is at least one selected from the group including polyoxyalkylene alkyl ethers, polyoxyalkylene alkylphenyl ethers, and polyoxyalkylene branched decyl ethers.

4. A nonaqueous electrolyte secondary cell comprising:
   a positive electrode having a foil-shaped positive electrode current collector provided with a positive electrode active material layer on at least one principal surface of the positive electrode current collector;
   a negative electrode having a foil-shaped negative electrode current collector provided with a negative electrode active material layer on at least one principal surface of the negative electrode current collector;
   a separator for avoiding contact between the positive electrode and the negative electrode; and
   a nonaqueous electrolyte solution operable to take part in electrode reactions on the positive electrode and the negative electrode,
   wherein the negative electrode active material layer contains a negative electrode active material, (A) a polyvinylidene fluoride component including polyvinylidene fluoride and/or a derivative having polyvinylidene fluoride as a main chain, (B) a styrene-butadiene component including a styrene-butadiene polymer and/or a derivative having a styrene-butadiene polymer as a main chain, and (C) a nonionic surfactant having a hydrophile-lipophile balance of 10 to 15,
   wherein the negative electrode active material layer is formed using a dispersion based mainly on N-methylpyrrolidone.

5. The negative electrode according to claim 1, wherein the negative electrode active material is a carbonaceous material.

6. The negative electrode according to claim 1, wherein a total amount of the polyvinylidene fluoride component and the styrene-butadiene component ranges from 1.5 parts by weight to 5 parts by weight based on 100 parts by weight of the negative electrode active material.

7. The negative electrode according to claim 1, wherein a mixing ratio of a weight of the polyvinylidene fluoride component to a weight of the styrene-butadiene component ranges from 9.5/0.5 to 2/8.

8. The negative electrode according to claim 1, wherein an amount of the nonionic surfactant having a hydrophile-lipophile balance of 10 to 15 ranges from 0.2 parts by weight to 1.5 parts by weight based on 100 parts by weight of the negative electrode active material.

9. The negative electrode according to claim 1, wherein a volume density of the negative electrode is about 1.9 g/cc to about 1.95 g/cc.

10. The nonaqueous electrolyte secondary cell according to claim 4, wherein a volume density of the negative electrode is about 1.9 g/cc to about 1.95 g/cc.

11. The nonaqueous electrolyte secondary cell according to claim 4, wherein a thickness of the separator is approximately 25 μm.

12. The negative electrode according to claim 1, wherein the negative electrode active material layer is formed using the styrene-butadiene component in a state of a water-soluble dispersion.

13. The negative electrode according to claim 1, wherein the nonionic surfactant having a hydrophile-lipophile balance of 10 to 15 comprises at least one selected from the group consisting of: polyoxyethylene isodecyl ether, polyoxyalkylene isotridecyl ether, polyoxyethylene isotridecyl ether, and polyoxyethylene alkylphenyl ether, and polyoxyalkylene alkyl ether.

* * * * *